United States Patent [19]

Olson et al.

[11] 4,373,384

[45] Feb. 15, 1983

[54] DIESEL ENGINE TIMING APPARATUS

[75] Inventors: Gene E. Olson, Kenosha, Wis.; Jerome A. Thompson, Milford, Mich.; Donald D. Grover, Kenosha, Wis.; Christopher B. Stout, Kenosha, Wis.; Thomas P. Becker, Kenosha, Wis.; Glenn A. Kaufman, Kenosha, Wis.

[73] Assignee: Snap-on Tools Corporation, Kenosha, Wis.

[21] Appl. No.: 286,186

[22] Filed: Jul. 23, 1981

[51] Int. Cl.³ ............................................. G01M 15/00
[52] U.S. Cl. ................................................. 73/119 A
[58] Field of Search ................. 73/116, 117.3, 119 A; 324/392

[56] References Cited

U.S. PATENT DOCUMENTS

| | | | |
|---|---|---|---|
| 2,139,828 | 12/1938 | Kandyba | 175/183 |
| 2,841,979 | 7/1958 | Harbert | 73/35 |
| 3,067,610 | 12/1962 | Bockemuehl et al. | 73/116 |
| 3,517,247 | 6/1970 | Szilagyi | 313/123 |
| 3,754,139 | 8/1973 | Swithenbank et al. | |
| 3,813,596 | 5/1974 | Hulls | 324/16 R |
| 3,939,397 | 2/1976 | Maisonville | 324/392 |
| 3,978,720 | 9/1976 | Ford | 73/116 |
| 4,337,648 | 7/1982 | Gillespie | 73/119 A X |

OTHER PUBLICATIONS

Lienesch, J. H. et al., *Using Microwaves and Prechamber . . . Timing,* G.M. Research Labs Paper, Jan. 23, 1980.

*Primary Examiner*—Jerry W. Myracle
*Attorney, Agent, or Firm*—Dithmar, Stotland, Stratman & Levy

[57] ABSTRACT

The apparatus comprises a luminosity probe to provide an electrical signal in response to the combustion event in a diesel engine and also comprises a probe to provide another electrical signal indicative of top dead center. Both electrical signals are processed and applied to a circuit which generates an output pulse having a duration corresponding to the time between the start of the electrical signals. A meter displays the angle represented by the duration of such pulse. Circuitry is provided to compensate for offset.

11 Claims, 3 Drawing Figures

DIESEL ENGINE TIMING APPARATUS

BACKGROUND OF THE INVENTION

In analyzing the timing of a diesel engine, determination is made of the number of degrees between the time a piston in a selected cylinder reaches its so-called "top dead center" position and the time that combustion takes place in that cylinder. Automobile manufacturers commonly specify the number of degrees at a specific engine speed as a compromise to numerous considerations which must be taken into account, such as reducing emissions, maximizing gas mileage, optimizing performance, etc. For example, an automobile manufacturer may specify that combustion should start five degrees after the piston has reached top dead center at an engine speed of 1,250 rpm.

Thus, in a diesel timing apparatus, the events of top dead center and combustion must be determined. The top dead center event is identified in the following manner. A diesel engine includes a wheel mounted on the end of the engine crank shaft so as to rotate therewith. A notch or other marking means is located in the periphery of the wheel. A receptacle for a sensing device is located on the engine block and is so located that the notch on the rotating wheel will pass the receptacle a known number of degrees of crank shaft rotation after the number one cylinder has reached its top-dead-center position. In presently manufactured diesel engines, such known number is either 20° or 9.5°. The sensing device may be magnetic in nature and have a transducer to provide an electrical signal 9.5° or 20° after top dead center.

The combustion event may be sensed by light occurring during combustion. In a diesel engine, fuel is first delivered to a prechamber. To increase the temperature of the prechamber to a value to insure engine starting, a so-called "glow plug" is threaded into an access port of each such prechamber. The glow plug is energized a few seconds before starting, but while the engine is actually operating, the glow plug is not energized. It has previously been proposed that while timing a diesel engine, the glow plug for the prechamber associated with the number one cylinder is removed and a luminosity probe inserted in its place. The luminosity probe includes a sensor which responds to light produced during the combustion event and generates an electrical signal.

An electrical signal produced in response to the top dead center event and an electrical signal in response to the combustion event are then processed and applied to circuitry which determines the time between the two. The time is translated to degrees of rotation which are displayed in some convenient manner. The serviceman timing a diesel engine can adjust the engine in order that the displayed angle matches the angle specified by the manufacturer for a particular speed.

It is important that the electrical signal for one event always occur before the electrical signal for the other event. For example, suppose the electrical signal in response to the combustion event occurs first, and the electrical signal in response to top dead center occurs next (the result of the electrical signal produced in response to top dead center being delayed by 9.5° or 20° from the actual top dead center event). Then, it is important that the electrical signal produced in response to the combustion event always occurs first. When the offset is 20°, that criterion presents no difficulty because variations in engine performance will rarely if ever be so far off that the electrical signal in response to the top dead center event would occur first. However, when an engine having a 9.5° offset is evaluated, the timing could be such that the electrical signal resulting from a top dead center event could occur before combustion in the corresponding cylinder.

SUMMARY OF THE INVENTION

It is therefore an important object of the present invention to provide an improved method and apparatus for timing a diesel engine.

Another object is to provide a diesel engine timing apparatus which will insure that an electrical signal in response to one selected event will always occur before the electrical signal in response to the other selected event.

Another object is to provide a diesel timing apparatus which will reliably give information on diesel engine timing for an engine having a plurality of offsets.

Another object is to provide improved circuitry for processing the electrical signal produced in response to light given off during the combustion event.

In summary, there is provided diesel engine timing apparatus for a diesel engine having a rotating part with mark means that passes a fixed point a predetermined number of degrees after top dead center of a selected cylinder, the diesel engine timing apparatus comprising a luminosity probe adapted to be coupled to the selected cylinder for producing a first recurring electrical signal in response to the recurring light produced in the selected cylinder during combustion therein, timer means for producing a recurring timer signal commencing with the electrical signal but having a substantially greater duration, a first pulse generator responsive to the leading edge of the timer signal for producing a train of first pulses each having a duration substantially shorter than the duration of the timer signal, means adjacent to the fixed point for producing a second recurring electrical signal in response to the rotating mark means, a second pulse generator responsive to the leading edge of the second recurring electrical signal for producing a train of second pulses, circuit means coupled to the first and second pulse generators and being responsive to each first pulse to start an output pulse and being responsive to each second pulse to terminate the output pulse, and means for displaying information corresponding to the duration of the output pulses.

Also, there is provided a method of determining the number of degrees between top dead center of a selected cylinder and combustion therein, the selected cylinder being in a diesel engine having a further cylinder that reaches top dead center a first predetermined number of degrees before the selected cylinder reaches top dead center, the diesel engine also having a rotating part with mark means thereon that passes a fixed point a second predetermined number of degrees after top dead center of the selected cylinder, the method comprising coupling the luminosity probe to the further cylinder for producing a first recurring electrical signal in response to the recurring light produced in the further cylinder during combustion therein, producing a train of first pulses each commencing with the leading edge of the first recurring electrical signal, producing a second recurring electrical signal in response to the rotating mark means, producing a train of second pulses each commencing with the leading edge of the second recurring electrical signal, producing a train of output pulses respectively starting with each first pulse and terminating with each second pulse, producing an output signal having an amplitude corresponding to the duration of the output pulses, applying the output signal to a meter, and applying an offset voltage to the meter to compensate for both the first and second predetermined numbers of degrees.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

CROSS-REFERENCE TO RELATED APPLICATION

A copending U.S. application owned by the assignee of subject application entitled "Luminosity Probe for Diesel Engine Timing Apparatus," Ser. No. 285,942, filed July 23, 1981, illustrates, describes and claims a luminosity probe used with the diesel engine timing apparatus of this application.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE PREFERRED EMBODIMENT

Figure 1:
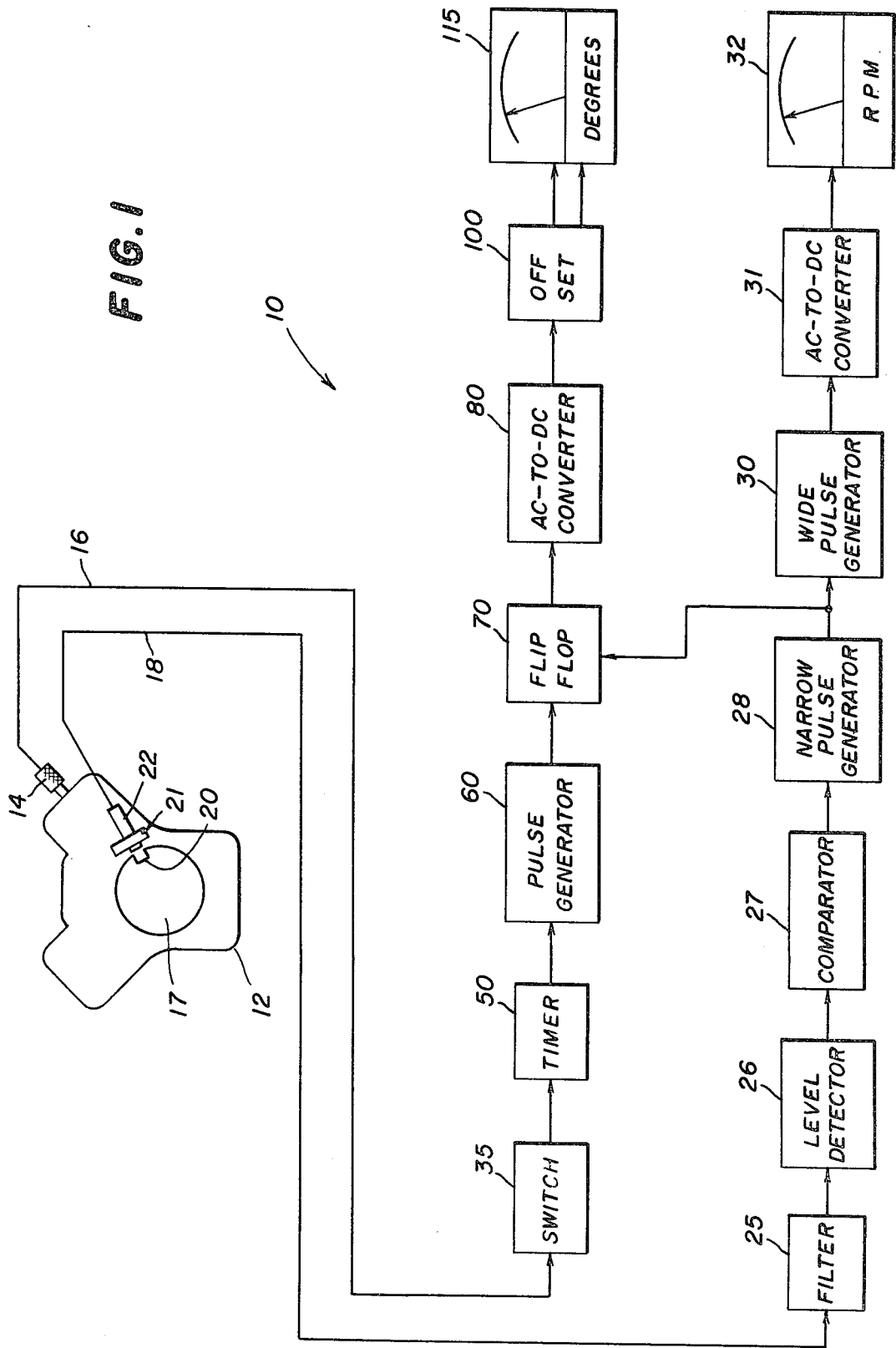
FIG. 1 depicts a block diagram of a diesel engine timing apparatus incorporating the features of the present invention.

Turning now to the drawings and more particularly to FIG. 1 thereof, there is depicted a diesel engine timing apparatus 10 incorporating the features of the present invention and being used to analyze and time a diesel engine 12 having eight cylinders, for example. Each cylinder has an associated prechamber (not shown) which in turn has a threaded opening (not shown) to accommodate a glow plug (not shown).

In FIG. 1 the glow plug for the number one cylinder (not shown) has been removed and replaced by a luminosity probe 14. The details of the luminosity probe 14 are described in the above-mentioned copending application. For the purposes of this application, it is sufficient to note that the luminosity probe senses the combustion event by responding to light generated during combustion. The probe 14 has a transducer which converts the light to an electrical or luminosity signal appearing on the conductors 16.

The crank shaft for the engine 12 has a rotating wheel 17 attached thereto. The manufacturer provides a notch 20 in the wheel 17 which passes a receptacle 21 a predetermined number of degrees after the piston in the number one cylinder reaches top dead center. When the engine 12 is being analyzed, there is inserted into such receptacle a probe 22 which magnetically responds to the notch 20 to provide an electrical signal on the conductors 18. The receptacle is so located that the notch 20 passes it a known number of degrees after top dead center. In some engines, such known number, or offset is 9.5° and in others it is 20°. Thus, there appears on the conductors 18 an electrical signal 9.5° or 20° after top dead center.

The diesel engine timing apparatus 10 may be said to include the probes 14 and 22.

The timing apparatus 10 also includes a filter 25 to which the electrical signal produced on the signal one of the conductors 18 is applied. The filter 25 removes extraneous high frequency noise that may be generated by the magnetic probe 22. The filter output is applied to a level detector 26 which converts the AC output to a DC signal for application to a comparator 27. If the DC voltage exceeds a predetermined value as established by a reference voltage in the comparator 27, an output voltage is generated. In response thereto the pulse generator 28 produces a narrow pulse on the order of microseconds in width. A pulse generator 30 responds to each narrow pulse to provide a wide pulse. An AC-to-DC converter 31 produces a DC voltage having a value generally proportional to the frequency of the pulses from the generator 30. A meter 32 displays the speed of the engine 12 which of course is proportional to the frequency of the pulses from the generator 30.

An electronic switch 35 produces a rectangular pulse in response to the generally unevenly shaped electrical signal on the conductors 16. A timer 50 produces a timer signal starting with the inception of the luminosity signal and terminating a fixed time thereafter. The time is established to be somewhat shorter than the duration between successive luminosity signals at the highest speed at which the engine will be analyzed, such as 6,000 rpm. Then, extraneous pulses will not affect the circuit performance. The ensuing circuitry responds to the inception of the timer signal. By making the timer signal almost as long as the time between successive pulses (at high engine speeds) rejection of spurious signals is accomplished. The timer signal is applied to a pulse generator 60 which responds to the leading edge of the timer signal to generate a short pulse, for example, of several microseconds in duration.

The output of the pulse generator 60 is coupled to the set input of a flip-flop circuit 70 the reset input of which is coupled to the pulse generator 28. A pulse from the pulse generator 60 sets the flip-flop and the next pulse from the pulse generator 28 resets the flip-flop. Thus, there is produced at the output of the flip-flop circuit 70 an output pulse commencing with the combustion event and terminating with an event representative of top dead center. The train of output pulses is coupled to an AC-to-DC converter 80 which produces a DC voltage proportional to the duration of each output pulse.

The DC voltage is applied to an offset circuit 100 which has two conditions established by a switch therein to be explained hereinafter. One position of the switch corresponds to a diesel engine in which the offset between top dead center and the occurrence of the electrical signal on the conductors 18 is 9.5°. The second switch position corresponds to an engine in which the offset is 20°. In the latter condition, the offset circuit 100 modifies the output of the converter 80 to compensate for the 20° offset. In the 9.5° condition, the offset provided by the circuit 100 corresponds to 99.5° for the following reasons and in the following manner. When the offset between the notch 20 and top dead center of the number one cylinder is 9.5°, it is possible that the engine may be tuned such that the timing angle between top dead center and the combustion event is 9.5° or longer. In that case, the electrical signal produced in response to top dead center could actually occur prior to the electrical signal produced by combustion in the number one cylinder. The apparatus 10 would not operate in response to such signals. Therefore, the present invention requires the luminosity probe 14 to be inserted into the prechamber associated with the cylinder in which fuel is ignited 90° prior to the number one cylinder.

An automotive diesel engine is commonly a four stroke engine and has eight cylinders. When one cylinder is at top dead center and combustion is taking place therein, another is also at top dead center but the gases therein are being exhausted. Using the standard nomenclature for cylinders in a diesel engine, when the number one cylinder is at top dead center so too is the number six cylinder, combustion taking place in one and exhaust in the other. Cylinders 2 and 3 lead cylinders 1 and 6 by 90°.

When the diesel engine being timed has a 9.5° offset between the notch 20 and top dead center, the luminosity probe 14 is inserted in place of the glow plug associated with the number 2 or number 3 cylinder, creating, in effect, a 99.5° offset. Irrespective of the timing of the engine being evaluated, the occurence of the electrical signal on the conductors 16 in response to the combustion event will lead by a very substantial amount the electrical signal on the conductors 18 corresponding to the top-dead-center event.

The offset circuit 100 therefore provides an offset corresponding to 99.5° when an engine with an offset of 9.5° is being timed.

The output of the offset circuit 100 is applied to a meter 115 which is calibrated in degrees and displays a value corresponding to the actual timing angle between top dead center of the number one cylinder and the combustion event in that cylinder. In one diesel engine, the manufacturer specifies that the timing angle should be 5° at 1,250 rpm. The serviceman analyzing the engine first causes the engine speed as read on the meter 115 to be 1,250, then reads the timing angle on the meter 115. If it does not display 5°, then the engine is adjusted until it does.

Figure 2:
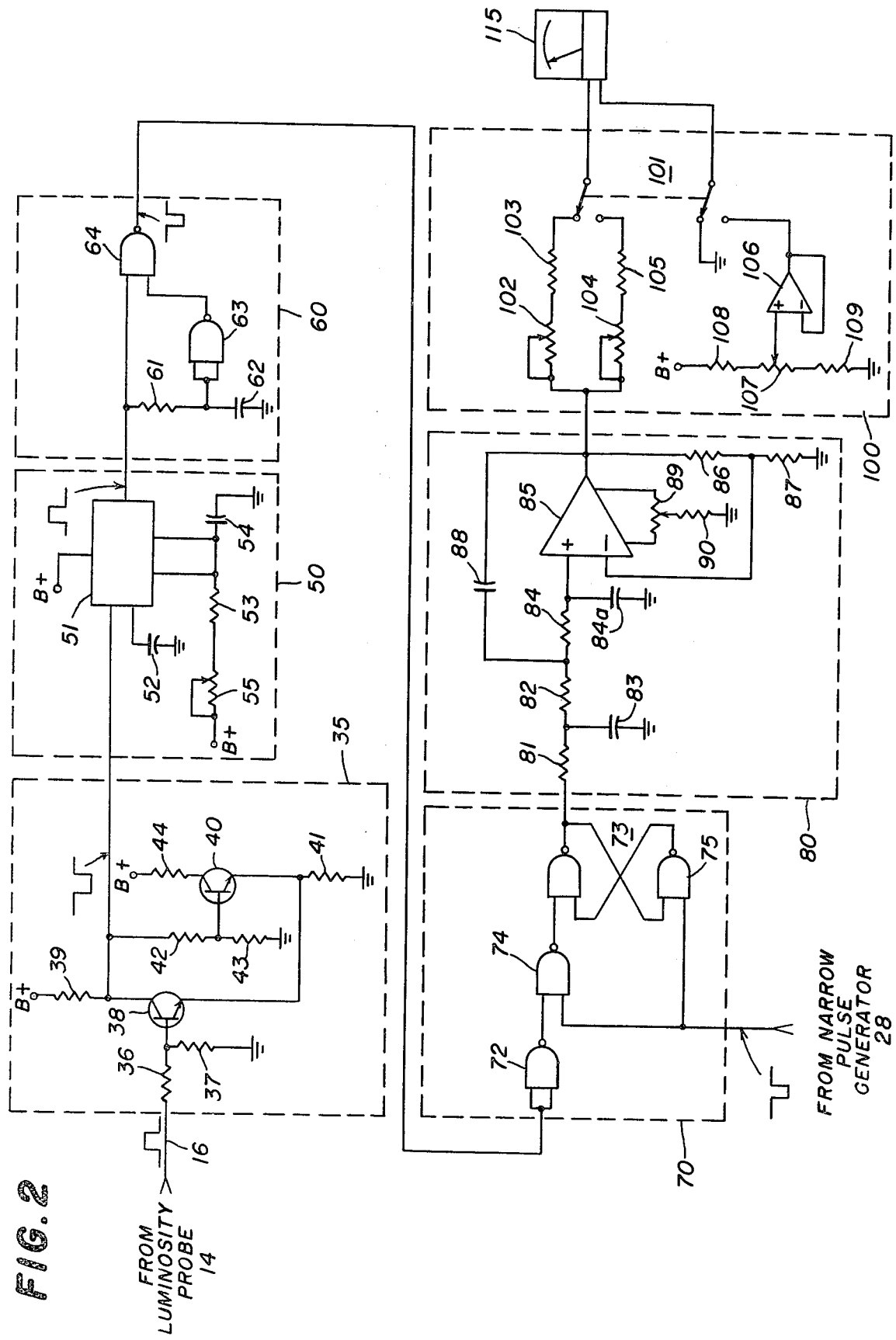
FIG. 2 depicts some of the circuits in the blocks of FIG. 1.

Turning now to FIG. 2, details of certain of the blocks in the block diagram of FIG. 1 will be described. In a preferred embodiment, the switch 35 is a Schmidt trigger including a pair of resistors 36 and 37 coupled between the conductors 18 (one of which is ground). The junction of the resistors 36 and 37 is coupled to a NPN transistor 38 the collector of which is coupled through a load resistor 39 to the supply voltage and the emitter of which is coupled to the emitter of a second NPN transistor 40. A resistor 41 is connected between ground and the emitters of both transistors. A pair of resistors 42 and 43 is coupled in series between the collector of the transistor 38 and ground. The junction of the resistors 42 and 43 is coupled to the base of the transistor 40. The transistor 40 has a load resistor 44 coupled to the B+ supply voltage.

Figure 3:
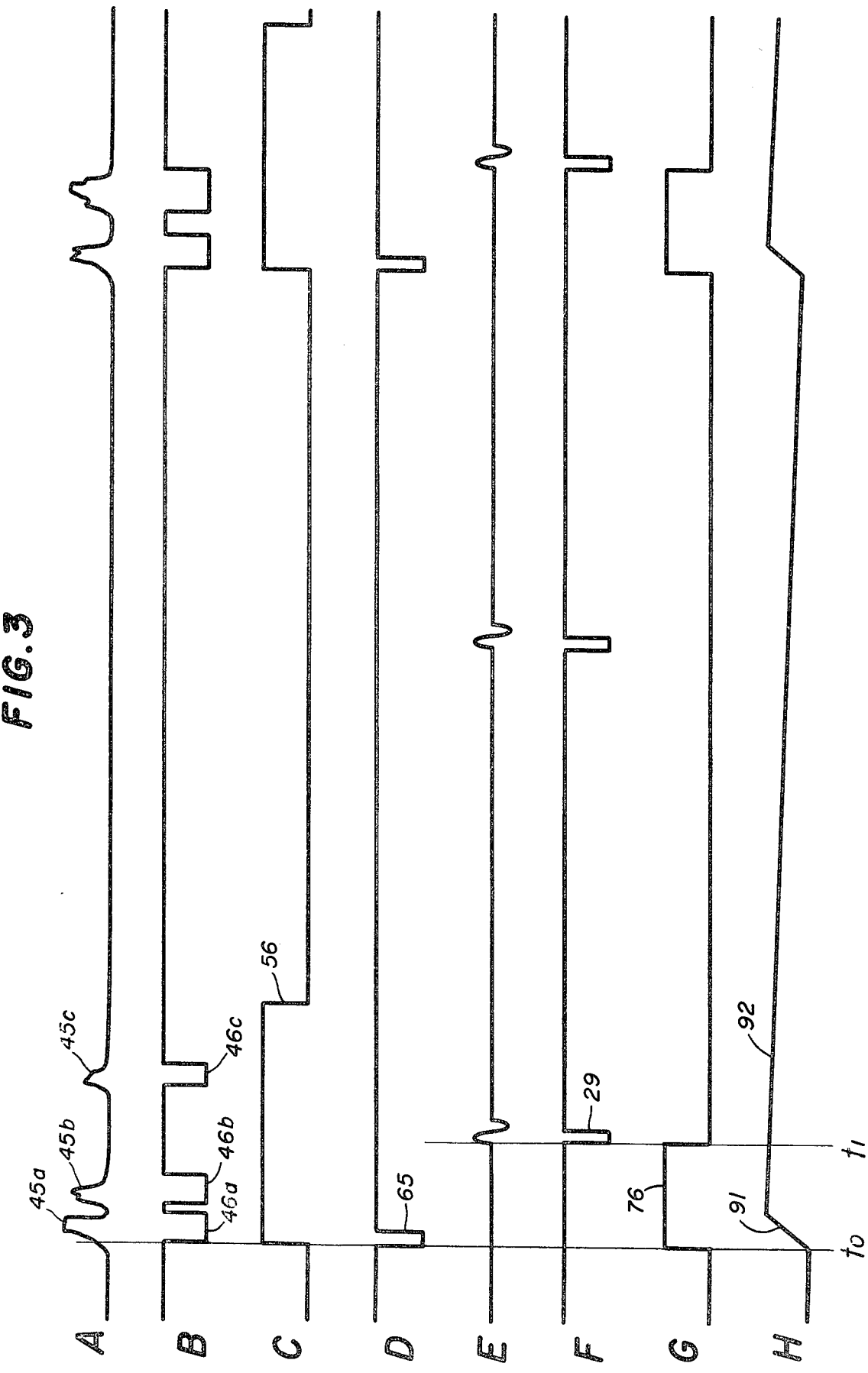
FIG. 3 depicts waveforms at various points in the diagram of FIG. 2.

The electrical signal 45 applied to the switch 35 is depicted in FIG. 3A and has three portions 45a, 45b and 45c each of somewhat irregular shape. The first portion 45a commences essentially at $t_0$. The portions 45b and 45c are extraneous, and there may be more or less of them. These extraneous portions should not affect the apparatus 10. The output of the switch 35 depicted in FIG. 3B has three portions 46a, 46b and 46c respectively corresponding to the portions 45a, 45b and 45c. The output is normally high and when the electrical signal 45 exceeds a threshold the output becomes low. At $t_0$, when the portion 45a of the electrical signal 45 exceeds the threshold level, the output of the switch 35 becomes low and stays low until the signal 45 again falls below the threshold, thereby creating the portion 46a.

In order that extraneous pulses such as the portions 46a and 46b have no effect on succeeding circuitry, the timer 50 is provided. The timer 50 is a monostable multivibrator comprising a type 555 integrated circuit 51. The trigger input of the circuit 51 is coupled to the output of the switch 35. Its control input is coupled through a capacitor 52 to ground. Its threshold input and discharge input are coupled together and to the junction of a resistor 53 and a capacitor 54.

A potentiometer 55 is coupled in series with the resistor 53 and the capacitor 54 between B+ and ground. The timer 50 produces a timer signal 56 depicted in FIG. 3C. The signal 56 becomes high at $t_0$ when the trigger input to the timer 50 becomes low. The signal 56 remains high for a period of time established by the value of the resistor 53, the potentiometer 55 and the capacitor 54. The values of these parts are selected such that the duration of the signal is slightly less than the time between successive pulses at the highest engine speed at which the engine would be analyzed. Then, no response would take place to the extraneous portions 45b and 45c of the electrical signal 45. In an operative embodiment, the resistor 53 was 10K, the capacitor 54 was 0.1 $\mu$F, and a 500K potentiometer 55 was set to cause the timer signal to have a duration of 12 ms.

The timer signal 56 is applied to the pulse generator 60 which includes a resistor 61 and a capacitor 62 coupled in series between the output of the timer 50 and ground. The junction of the resistor 61 and the capacitor 62 is coupled through an inverter 63 to one input of a NAND gate 64, the other input of which is coupled directly to the output of the timer 50. The pulse generator 60 produces a pulse 65 depicted in FIG. 3D, commencing at time $t_0$ and terminating a time later dependent on the values of the resistor 61 and the capacitor 62. In one embodiment, the resistor 61 had a value of 1K and the capacitor had a value of 0.01 $\mu$F so that the duration of the pulse 65 was 10 $\mu$s. The output of the pulse generator 60 is coupled to a flip-flop circuit 70 which includes an inverter 71 having its output coupled to one input of a NAND gate 72. The other input of the NAND gate 72 is coupled to the output of the narrow pulse generator 28. The output of the NAND gate 72 is coupled to a latch 73 having NAND gates 74 and 75 connected as shown.

The electrical signal applied to the filter 25 is depicted in FIG. 3E and consists of a sequence of sine waves that occur as the marking means or notch 20 passes the probe 22. The sine waves are converted into pulses as shown in FIG. 3F. The first such pulse 29 commences at $t_1$. The pulse 65 from the pulse generator 60 and the pulse 29 from the pulse generator 28 are respectively coupled to the reset and set inputs of the flip-flop circuit 70, the output pulse 76 of which is depicted in FIG. 3G. The output of the flip-flop circuit is normally low. At $t_0$, with the inception of the pulse 65, the flip-flop circuit 70 is set and the output becomes high and remains high until $t_1$ at which time the pulse 29 commences causing the flip-flop circuit 70 to reset, whereby its output again becomes low, to produce the pulse 76. The duration of the pulse 76 is equal to the time between the start of combustion in the cylinder to which the probe 14 is coupled and the time at which the notch 20 passes the probe 22.

The output pulse 76 is applied to an AC-to-DC converter 80 which includes integrating circuitry defined by a pair of resistors 81 and 82 connected in series and a capacitor 83 connected between the junction thereof and ground. The integrating circuitry also includes a resistor 84 connected to the signal input of an operational amplifier 85. A capacitor 84a is connected between such input and ground. The other input of the amplifier 85 is copupled to the junction of a pair of resistors 86 and 87 connected between the output of the amplifier 85 and ground. A capacitor 88 is connected between the output of the amplifier 85 and the junction of the resistors 82 and 84. A potentiometer 89 and a resistor 90 enable adjustment of the gain of the amplifier 85. The output of the amplifier 85 is depicted in FIG. 3H and consists of an initial fast-rise portion 91 and a slow fall portion 92. The output of the amplifier 85 is basically a DC voltage having a value corresponding to the duration of the pulses 76 from the flip-flop circuit 70.

In the case of an engine with 20° offset, the duration of each pulse 76 will be 20° "too long". In other words, each such pulse will have a duration equal to the sum of the timing angle between top dead center and combustion plus 20°. In the case of an engine with a 9.5° offset, the duration of each signal pulse 76 will be 99.5° "too long." The offset circuit 100 is provided to compensate for the offset.

The offset circuit 100 has a switch 101 with a 20° position and a 99.5° position. In the 20° position, the output of the converter 80 is coupled through a potentiometer 102 and a resistor 103 to one input of the meter 115 and the other input is coupled to ground. The potentiometer 102 is adjusted to compensate for the 20° offset so that the reading on the meter 115 will be in degrees of timing angle. In the second position of the switch 101, a potentiometer 104 is coupled in series with a resistor 105 to the first input of the meter 115 and the second input is coupled to the output of a buffer amplifier 106 having its input coupled to the arm of a potentiometer 107. Resistors 108 and 109 are coupled in series with the potentiometer 107 between the B+ supply voltage and ground. The second terminal of the meter 115 is placed at an elevated voltage when a 9.5° engine is being analyzed rather than ground when a 20° engine is being analyzed. The potentiometer 107 is adjusted to provide a selected voltage to the buffer amplifier 106 and in turn provide a voltage to the second input of the meter 115 to compensate for the very substantial 99.5° offset. Again, with such compensation, the meter 115 will display the number of degrees of advance between top dead center and the combustion event.

In calibrating the converter 80 and the offset circuit 100, the switch 101 is placed in the 20° position and the meter is calibrated at a retard setting of say −10° and an advance setting of say +10°. Using known signals applied to the switch 35 and the filter 25 to give a −10° retard, the gain of the amplifier 85 is adjusted using the potentiometer 89 until the meter 115 reads −10°. Then the signals applied are changed such that a +10° timing angle is provided. The potentiometer 102 is then adjusted until +10° is displayed on the meter 115. In practice, the one making the calibration changes back and forth between the two different inputs and adjusts the potentiometers 89 and 102 until the proper readings are obtained.

Then, the timing apparatus 10 is calibrated for the 9.5° engine. The switch 101 is replaced in the 99.5° position. The signals applied to the filter 25 and the switch 35 are such that a known retard of −10° is achieved. The potentiometer 104 is adjusted so that −10° is displayed on the meter 115. Then the signals are changed so that a +10° advance between the two input signals is applied. The potentiometer 107 is adjusted to give a +10° reading on the meter 115.

What has been described therefore is an improved diesel timing apparatus which utilizes a signal representative of top dead center and a luminosity signal produced in response to the combustion event in a certain cylinder. Improved processing circuitry is provided to process the luminosity signal and maximize accuracy and the rejection of spurious signals. Furthermore, the timing apparatus is able to time a diesel engine with a substantial amount of offset (e.g. 20°) or a small amount of offset (e.g. 9.5°). In the latter case, timing of the number one cylinder is attained by mounting the luminosity probe in a cylinder which is ignited a known number of degrees before the number one cylinder.

We claim:

1. Diesel engine timing apparatus for a diesel engine having a rotating part with mark means that passes a fixed point a predetermined number of degrees after top dead center of a selected cylinder, said diesel engine timing apparatus comprising a luminosity probe adapted to be coupled to the selected cylinder for producing a first recurring electrical signal in response to the recurring light produced in the selected cylinder during combustion therein, timer means for producing a recurring timer signal commencing with the electrical signal but having a substantially greater duration, a first pulse generator responsive to the leading edge of the timer signal for producing a train of first pulses each having a duration substantially shorter than the duration of the timer signal, means adjacent to the fixed point for producing a second recurring electrical signal in response to the rotating mark means, a second pulse generator responsive to the leading edge of the second recurring electrical signal for producing a train of second pulses, circuit means coupled to said first and second pulse generators and being responsive to each first pulse to start an output pulse and being responsive to each second pulse to terminate the output pulse, and means for displaying information corresponding to the duration of the output pulses.

2. The diesel timing apparatus of claim 1 and further comprising a Schmidt trigger circuit for squaring the first recurring electrical signal prior to application to said timer means.

3. The diesel timing apparatus of claim 1, wherein said timer means is a monostable multivibrator.

4. The diesel timing apparatus of claim 1, wherein said timer means includes means for adjusting the duration of the timer signal.

5. The diesel timing apparatus of claim 4, wherein said adjusting means is set so that the duration of each timer signal occupies a substantial portion of the space between the start of successive first electrical signals at the highest speed at which the diesel engine will be tested.

6. The diesel timing apparatus of claim 1, wherein said circuit means is a flip-flop circuit.

7. The diesel timing apparatus of claim 1, wherein said display means is an analog meter.

8. The diesel timing apparatus of claim 1, and further comprising converter means for producing a DC voltage having an amplitude corresponding to the duration of the output pulses, said display means being an analog meter coupled to receive the DC voltage.

9. Diesel timing apparatus for determining the number of degrees between top dead center of a selected cylinder and combustion therein, the selected cylinder being in a diesel engine having a further cylinder that reaches top dead center 90° before the selected cylinder reaches top dead center, the diesel engine also having a rotating part with mark means thereon that passes a fixed point either a first predetermined angle or a second predetermined angle after top dead center of the selected cylinder, said diesel timing apparatus comprising a luminosity probe for coupling to one of the cylinders for producing a first recurring electrical signal in response to the recurring light produced in the one cylinder during combustion therein, said luminosity probe being coupled to the selected cylinder when the mark means is at the first predetermined angle and being coupled to the further cylinder when the mark means is at the second predetermined angle, means for producing a train of first pulses each commencing with the leading of the first recurring electrical signal, means for producing a second recurring electrical signal in response to the rotating mark means, means for producing a train of second pulses each commencing with the leading edge of the second recurring electrical signal, means for producing a train of output pulses respectively starting with each first pulse and terminating with each second pulse, means for producing an output signal having an amplitude corresponding to the duration of the output pulses, meter means for displaying information corresponding to the duration of the output pulses, and offset means having first and second conditions respectively corresponding to the first and second predetermined angles, said offset means in the first condition thereof being operative to compensate for the first predetermined angle and being operative in the second condition thereof to compensate for both the second predetermined angle and the 90° angle.

10. The diesel timing apparatus of claim 9, wherein said meter means has first and second voltage supply terminals, said offset means including first and second resistance means and a voltage supply means, said first terminal being coupled through said first resistance means to said output signal producing means when a diesel engine with said first predetermined angle is being timed, said first terminal being coupled through said second resistance means to said output signal producing means when a diesel engine with said second predetermined angle is being timed, said second terminal being coupled to ground when an engine with the first predetermined angle is being timed and being coupled to said voltage source when an engine with the second predetermined angle is being timed.

11. A method of determining the number of degrees between top dead center of a selected cylinder and combustion therein, the selected cylinder being in a diesel engine having a further cylinder that reaches top dead center a first predetermined number of degrees before the selected cylinder reaches top dead center, the diesel engine also having a rotating part with mark means thereon that passes a fixed point a second predetermined number of degrees after top dead center of the selected cylinder, the method comprising coupling a luminosity probe to the further cylinder for producing a first recurring electrical signal in response to the recurring light produced in the further cylinder during combustion therein, producing a train of first pulses each commencing with the leading edge of the first recurring electrical signal, producing a second recurring electrical signal in response to the rotating mark means, producing a train of second pulses each commencing with the leading edge of the second recurring electrical signal, producing a train of output pulses respectively starting with each first pulse and terminating with each second pulse, producing an output signal having an amplitude corresponding to the duration of the output pulses, applying the output signal to a meter, and applying an offset voltage to the meter to compensate for both the first and second predetermined numbers of degrees.

* * * * *